April 18, 1944.    J. H. HACKENBERG ET AL    2,346,675
ELECTRICAL RECORDING STYLUS AND METHOD OF MAKING THE SAME
Filed Aug. 3, 1940
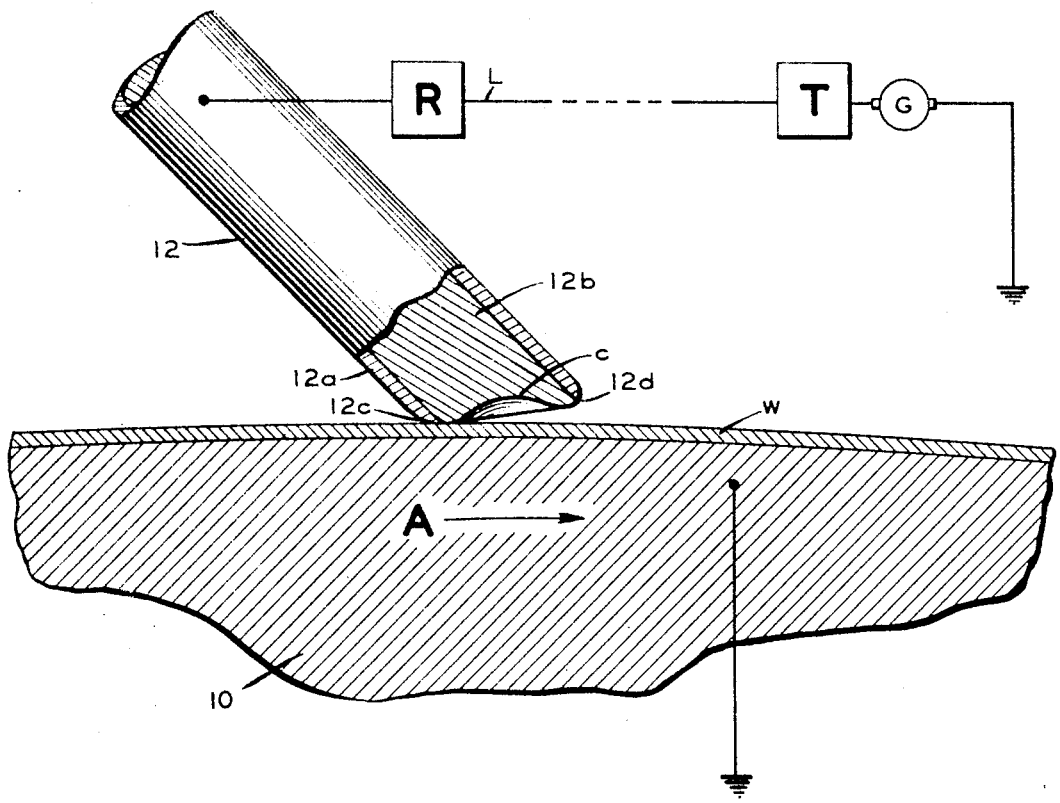
INVENTORS
J. H. HACKENBERG
R. J. WISE
BY
ATTORNEY Patented Apr. 18, 1944

2,346,675

UNITED STATES PATENT OFFICE 2,346,675

ELECTRICAL RECORDING STYLUS AND METHOD OF MAKING THE SAME

John H. Hackenberg, New York, N. Y., and Raleigh J. Wise, Dunellen, N. J., assignors to The Western Union Telegraph Company, New York, N. Y., a corporation of New York Application August 3, 1940, Serial No. 350,454

4 Claims. (Cl. 234—70)

This invention relates generally to a new and improved form of electrical recording stylus, and method of making the same, and more particularly to a recording stylus adapted for use in telegraph and facsimile systems, in which marks may be made upon a recording medium by subjecting selected areas of the surface of the medium to electrical potentials or currents representing received signals to cause marking of a visible record on the recording medium.

In various signaling and recording systems known in the art, for example, telegraph facsimile systems and the like, electrical signalling currents representative of a picture, message or other subject matter are generated and transmitted to a receiver where they are applied to a specially prepared recording blank, the recording blank being scanned by a stylus through which the signaling or marking currents are conducted, which currents are caused to pass through the recording paper or otherwise affect the surface thereof to mark the same in accordance with the received signals. Usually, although not necessarily, the recording blank is carried by a metallic cylinder, and during transmission of signals either the cylinder or the stylus is rotated at the proper speed, for example, in synchronism with a transmitting cylinder, and the marking stylus, whose point bears on the surface of the recording blank, is caused to traverse the cylinder so that the stylus point describes a helical path over the surface of the recording blank on the cylinder and thus produces a scanning action. Various methods of obtaining the scanning movements just described are well known, as are also methods of transmitting and receiving signals in proper timed relation with respect to the movement of the recording cylinder or stylus for marking the blank, which signals may comprise an alternating current modulated in accordance with the signals transmitted, or may comprise a direct current which is varied in accordance with the signals. Apparatus for transmitting and recording signals of the character described, and particularly for facsimile recording, are, for example, disclosed in U. S. Letters Patent to R. J. Wise, No. 2,153,858, issued April 11, 1939, and No. 2,158,391, issued May 16, 1939.

Various suitable types of recording blanks are also well known in the art, such, for example, as a recording paper which is chemically treated so that the application thereto or passage thereto through of signalling currents, in selected areas of the paper, as determined by the transmitted signals, causes color changes in such areas of the paper or in the chemical with which the paper is treated and thereby produces marking effects. Preferably, dry recording papers or webs are employed, such as disclosed in the patent to R. J. Wise et al., No. 2,294,147, issued August 25, 1942; the patent to B. L. Kline, No. 2,251,742, issued August 5, 1941; or the patent to R. J. Wise, No. 2,294,146, issued August 25, 1942.

Due to the friction between the end of the stylus which bears on the recording paper on a rapidly revolving recording drum, the end of the stylus of the type heretofore employed is rapidly worn smooth so that substantially the entire area of that portion of the stylus adjacent to the paper is in contact with the paper, and this area is increased by reason of the fact that the stylus is inclined at an angle to the tangential surface of the recording drum and paper so that the area of contact between the stylus and the recording paper is even greater than the cross-sectional area of the stylus. This causes the reproduced record to become blurred around the edges of the characters or other subject matter recorded, and prevents sharp definition of the recorded subject matter. Not only is the contact between the stylus and paper increased from a point contact to a substantially large area of contact, but when the stylus engages the paper over the entire surface of that portion of the stylus which is adjacent to the paper, the blurring effect is present in the area around the periphery of the stylus where it contacts the paper, and even though the end of the stylus may frequently be cut off by pliers or other tools in an attempt to retain a fine point contact with the paper, the increased sharpness in definition obtained thereby lasts only for the relatively short time required for the adjacent surface of the stylus to wear down.

An object of the present invention is to obviate the foregoing disadvantages of the type of stylus heretofore employed and to provide an improved electrical recording stylus, and method of making the same, in which the area of surface contact between the stylus and the recording paper is substantially reduced and so maintained during the recording operations.

Another object of the invention is a stylus which causes increased current density at the point where the current is applied to the recording paper.

An additional object is an electrical recording stylus which insures sharper definition of the recorded image than has been possible with the type of stylus heretofore employed.

Other objects and attendant advantages will be apparent from the following detailed description, taken in connection with the accompanying drawing.

The drawing schematically illustrates a facsimile transmitting and receiving circuit employing a recording stylus constructed in accordance with the present invention, the stylus being shown in its operative position for marking recording paper mounted on a revolving cylinder, various of the elements being shown in section.

Referring to the drawing, there is shown a fragmentary cross-sectional view of a cylindrical metallic recording drum 10, which may be of any suitable type, such as disclosed in the aforesaid Patents Nos. 2,153,858 and 2,158,391, or in the aforesaid copending applications, the drum being rotatable, in the direction of the arrow A, at the proper speed, i. e., in synchronism with a signal transmitting drum. Wrapped around and carried by the drum 10 is a recording blank or web w which may be one of the recording papers disclosed in the aforesaid applications or other known kind of recording medium suitable for the purpose. Bearing on the blank w is a recording stylus 12 constructed in accordance with the present invention. Current generated by the source G is modulated or otherwise controlled by the transmitter apparatus T to produce and transmit alternating current signals representative of the subject matter transmitted, which signals may be produced and transmitted in the manner disclosed in the aforesaid patents and applications or in any other suitable manner known in the art. The transmitter is interconnected with the receiving apparatus R by an available communication circuit L. At the receiving apparatus the signals are amplified and may be applied to the recording stylus in the manner disclosed in the aforesaid patents and applications. It will be understood that, in the illustrative embodiment shown, the stylus 12 is mounted so as to traverse the rotating cylinder 10 longitudinally so that the stylus point describes a helical path as it moves over the surface of the recording blank w to produce a scanning action.

The marks produced on the recording paper w usually are black, and the record simulates ordinary printing or writing as it appears as a black mark or marks in contrast to the background of the paper.

The stylus comprises an outer shell or coating 12a of a refractory metal, such as chromium, rhodium, tungsten, molybdenum or other suitable material having the proper degree of hardness relative to the core 12b which is within the outer shell. The principal requirements of a material suitable for use as the shell of the stylus are that it be resistant to the wear attendant upon the scanning operation, have a relatively high melting point with respect to that of the core, and preferably, although not necessarily, be susceptible of being applied to the core by electrodeposition. Accordingly, as used in the specification and in the appended claims the term "refractory metal" is defined as a metal having the properties of being able to resist fusion by heat at relatively high temperatures and to resist abrasion while hot. The core 12b is composed of a softer or less refractory metal, such as iron, steel, bronze, beryllium copper or other suitable electrode material. The essential requisite of a material suitable for use as the core of the stylus is that it have sufficient mechanical strength to permit handling and to withstand the slight shocks to which a facsimile recording stylus usually is subjected in operation. In a preferred form the core is made from a steel piano wire which is coated with chromium to form the outer shell. When marking on a recording medium, for example, a chemically treated or coated paper, and particularly when alternating current signals are being received, the surface of the stylus adjacent to the recording paper assumes and maintains a peculiar contour which forms a cavity or crater c near the center of the material of the core 12b and a hump at the point where the stylus touches the paper, such as the leading edge 12c. The trailing edge 12d does not engage the paper. There are two major factors which influence the formation and destruction of this cavity or crater; the factor which influences its formation is the passage of current between the stylus and recording paper, and the factor which influences its destruction appears to be the friction of the stylus against the paper. The use of a cored stylus in which the outer surface or shell comprises an extremely hard or refractory metal provides a wear-resistant outer shell having a high melting point relative to that of the core which maintains the edge of the cavity c, and at the same time the softer core is eroded or sputtered off by the passage of the current, thus maintaining the cavity or crater intact. With a crater such as described there is a greater concentration of marking current at the central portion of the stylus point, and thus increased current density at the point where the paper is to be marked which results in much sharper definition than has heretofore been obtainable, and the fuzzy appearance around the edges of the characters or subject matter recorded is substantially eliminated.

The erosion of the core previously described gradually shortens this portion of the stylus. It has been found that the configuration of a recording stylus substantially as illustrated is considered at present to be best adapted to produce the optimum in sharp definition. Consequently, in order to maintain this configuration it is necessary that the shell be worn away by friction between it and the recording surface at substantially the same rate that the core is worn away or eroded by the passage of the marking current therethrough. The slower both of these rates can be made, the longer life the stylus will have. Accordingly, the ideal core material is one which will provide the stylus with sufficient strength for use as a recording stylus and at the same time to have the maximum melting point obtainable in the material having the strength required. The ideal material for use as the shell of the stylus will be hard enough to be worn away by friction at substantially the same rate as the core is eroded by the marking current. In addition to the relative hardness requirement of the ideal shell material, it must also possess a sufficiently high melting point to prevent sputtering off or erosion by the marking current.

When alternating current signals are employed, the stylus when first applied to the paper does not have to have the crater c preformed since as soon as recording is begun the crater is rapidly formed by the passage of the signaling current. For example, with a recording drum 10 approximately two and one-half inches in diameter and rotating at a speed of 180 R. P. M., a well-formed crater is obtained within approximately the first inch of recording, as measured longitudinally of the drum, particularly if a signal comprising a steady tone of suitable frequency, for example, of the order of 2500 cycles, is transmitted to the recording stylus. The crater thus formed remains formed during the reception of the signaling currents in the case of alternating current marking signals, and retains its formation in the case of direct current marking signals for a considerable period of time. When employing direct current signals, if the crater $c$ in time should disappear, the crater may be reformed by applying to the stylus, when in contact with a recording medium, steady alternating current tone signals for a short period of time, and if desired the crater may be preformed in the first instance in this manner.

The coating $12a$ of chromium or other refractory material may be applied to the core $12b$ in any suitable manner such, for example, as by electrodepositing chromium from solutions of chromic acid or other suitable electrolytic solution. Also, the shell $12a$ of refractory conducting material may be formed first and then filled with a suitable material for forming the core $12b$. Excellent results have been obtained by making the thickness of the coating or shell $12a$ of the order of one mil, and the diameter of the inner core $12b$ of the order of eight or ten mils, the overall diameter of the stylus $12$ being of the order of ten or twelve mils, although the thickness of the outer shell and the diameter of the core may be varied within considerable limits depending upon the current densities to be employed, the contact friction, the nature of the record to be produced, the characteristics of the transmitting and receiving circuits, and other factors.

While the invention is described in connection with a facsimile telegraph system it is to be understood that the stylus may be employed in various other kinds of systems for producing records of various kinds on a prepared paper, chart or other recording medium. Also, the signalling or marking current applied to the stylus may be either alternating or direct in character, and may be generated or transmitted in any suitable manner, and the scanning or marking action at the recorder may be effected either by moving the recording medium relative to the stylus or the stylus relative to the recording medium, or both may be moved so as to cause relative movement between them.

We claim:
1. A facsimile telegraph recording stylus for scanning a recording medium and applying thereto electrical marking currents to produce a facsimile record in accordance with telegraph signals received, said stylus comprising a shell composed of a refractory metal, and a core within said shell, said core being composed of a conducting material which is softer than the metal of said shell and having a crater therein at the scanning end of the stylus.

2. A recording stylus for scanning a recording medium and applying to selected areas of the surface of said medium electrical marking currents for producing a record thereon, said stylus comprising an outer shell composed of a refractory metal, and a core within said shell, said core being composed of a conducting material which is less refractory than the metal of said shell and which sputters and forms a crater at the scanning end of the stylus when marking currents pass between said end of the stylus and the recording medium.

3. The method of making a recording stylus for scanning a recording medium and applying to selected areas of the surface of said medium electrical marking currents for producing a record thereon, which comprises enclosing a core of conducting material with an enclosing shell of a refractory metal, and forming a crater in the scanning end of said core by passing alternating current of relatively high frequency through said stylus while maintaining said scanning end in contact with an electrode in said alternating current circuit so as to cause the scanning end of the core to sputter off and form a crater therein.

4. A recording stylus for scanning a recording medium and applying to selected areas of the surface of the medium electrical marking currents for producing a record thereon said stylus comprising a shell composed of a metal of the class consisting of chromium, rhodium, tungsten and molybdenum, said shell being open at the scanning end thereof, and a core within said shell composed of a metal of the class consisting of iron, steel, bronze and beryllium copper, said core having a crater formed at the scanning end thereof by said marking currents.

JOHN H. HACKENBERG.
RALEIGH J. WISE.